Patented July 3, 1934

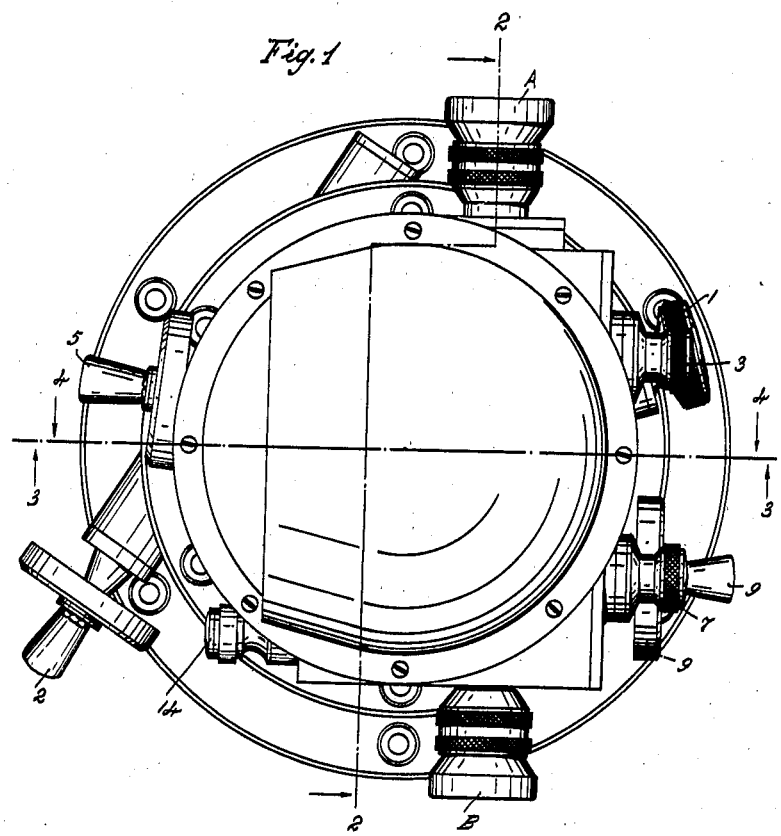

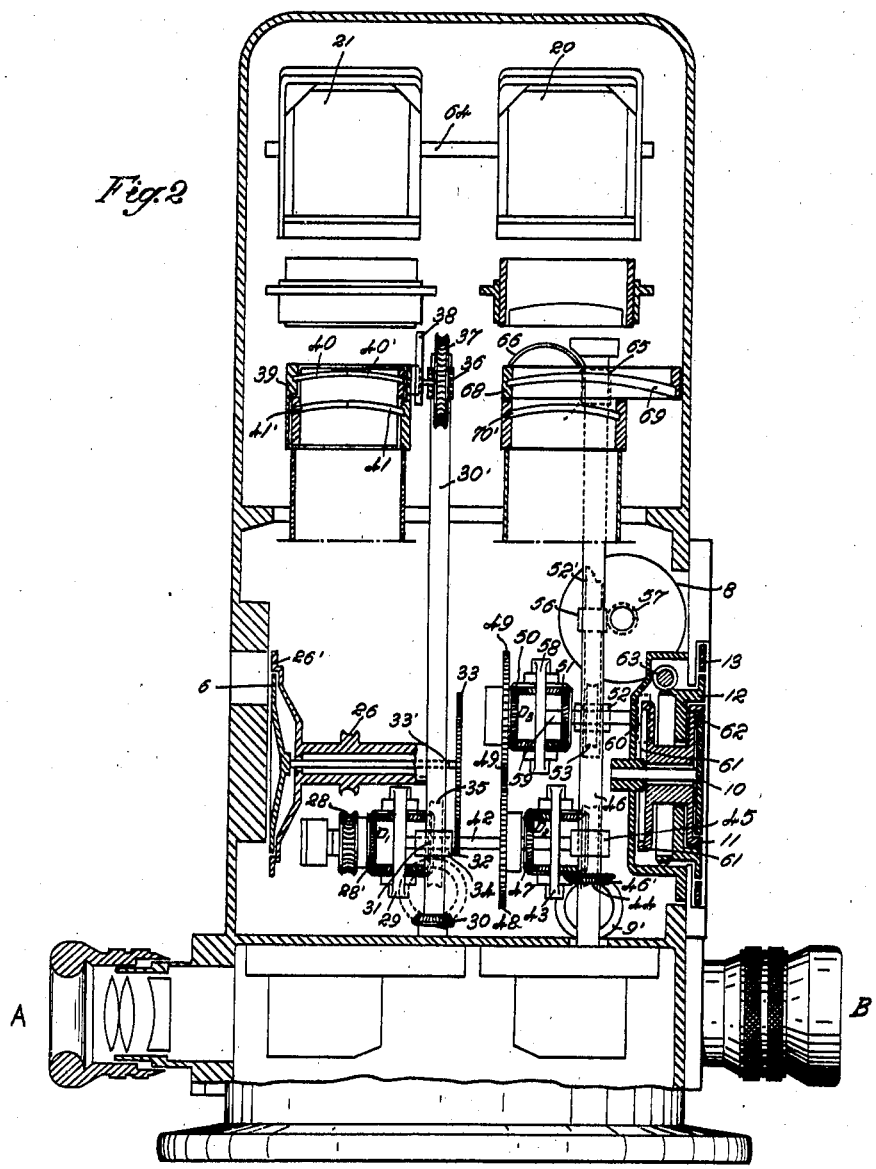

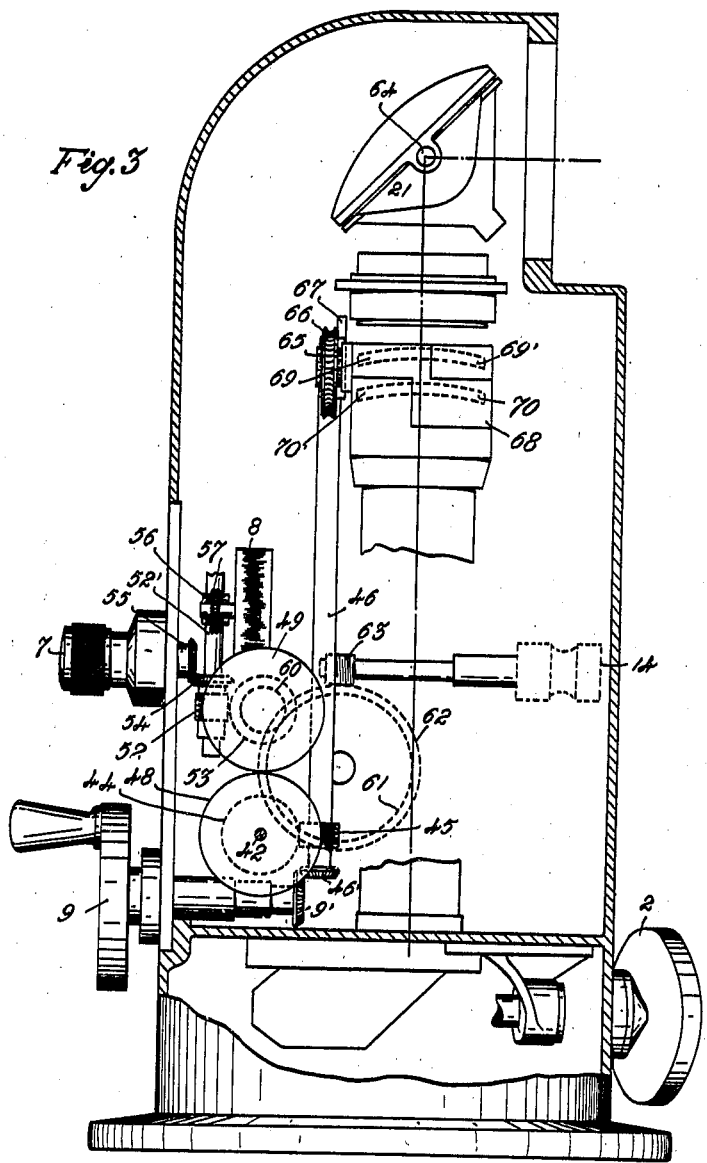

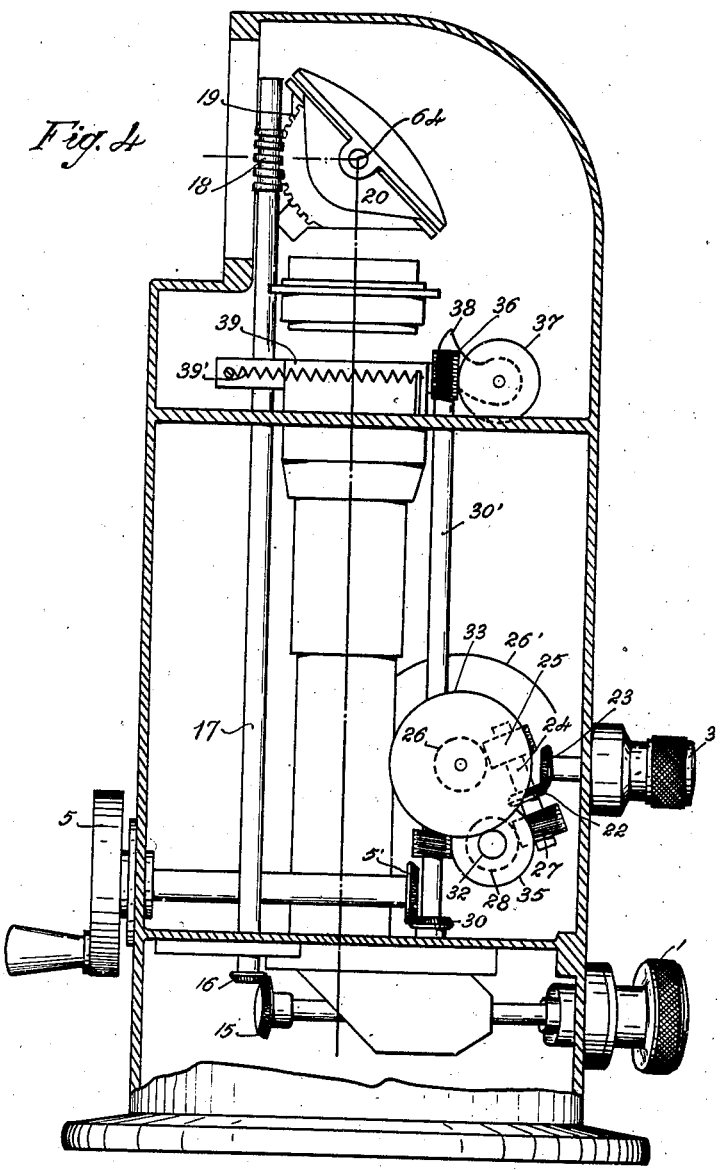

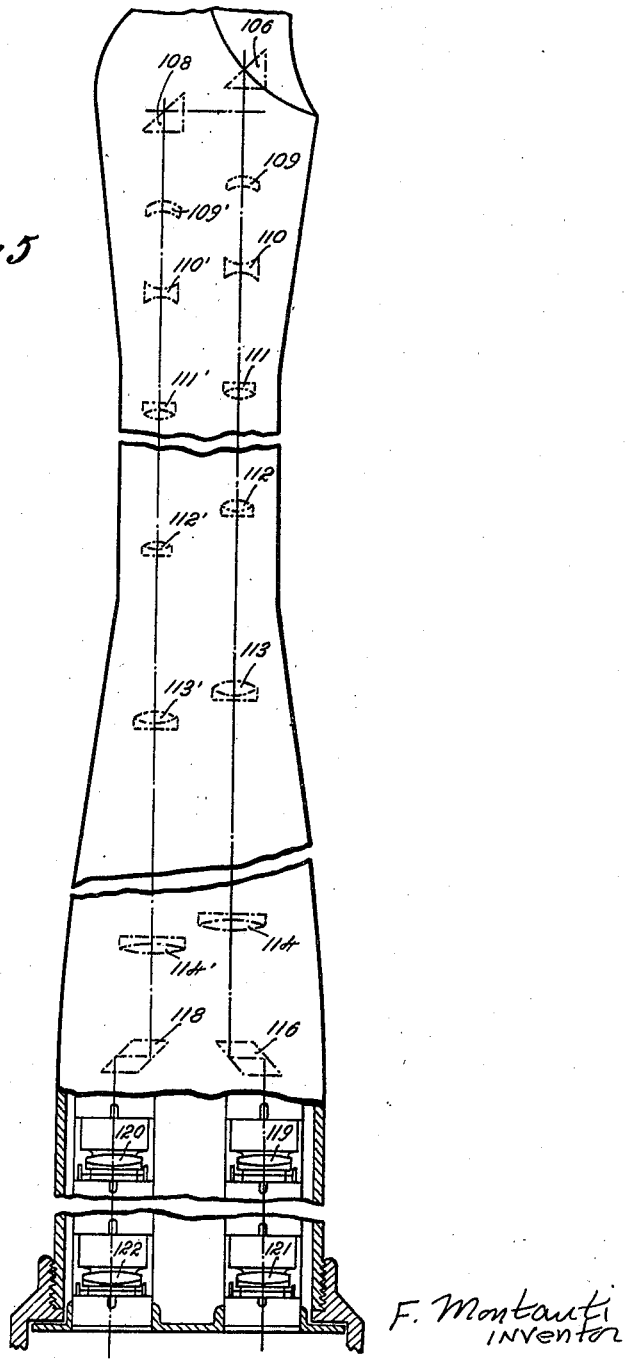

1,965,506

UNITED STATES PATENT OFFICE

1,965,506

OPTICAL INSTRUMENT FOR DETERMINING THE GUN FIRING AND TORPEDO LAUNCHING DATA

Francesco Montauti, Livorno, Italy

Application April 13, 1933, Serial No. 666,000
In Italy October 4, 1932

6 Claims. (Cl. 88—2.7)

This invention relates to optical instruments to be used on war ships and more specially on flotilla leaders, destroyers, torpedo-boats and submarines, for determining the gun firing data, and has for object to provide an improved instrument which permits to ascertain at the same time the distance of a moving ship and the angle formed by said ship's course with the plane of sight (which is generally designated as angle $\beta$) the height and the length of said ship, or a part thereof, being known quantities.

Another object of the present invention is to provide an optical instrument of the kind specified hereinabove which permits at the same time as the above mentioned data, to ascertain the launching angle, by the setting of a section of said improved instrument in relation to the ratio between the target and the torpedo speeds, no special or further operations, beside those for determining the distance and angle $\beta$, being required.

A further object of the invention is to provide an instrument of the kind specified above which, while used as a range finder, may attain the same degree of approximation as the ordinary range finders of medium size, although requiring less room.

A still further object of the invention is to provide an instrument of the kind specified which is strong, compact, relatively cheap in construction, easily removable from one place of the ship to another, at least in the form of construction adapted for surface vessels, and which will not be unduly affected by changes in atmospheric conditions.

A still further object of the invention is to provide an instrument of the kind specified which can be used by any operator whatever, contrary to what happens with the ordinary range finders and other optical instruments, which require purposely trained operators.

In order to attain the above mentioned and other objects which will be apparent as the specification proceeds, the instrument according to the invention consists of three combined sections, which serve respectively to measure the distance, to find out the mentioned angle $\beta$ and to determine the launching angle.

The hereinabove mentioned sections are so combined and assembled that on measuring the distance, besides moving a graduated scale which indicates the distance, the second section of the instrument is automatically set.

The instrument according to the invention is so designed that it is also possible to obtain one only of the above mentioned data, whilst the others obtained by means of separate instruments are introduced in the actual instrument.

For the telemetric observations it has been deemed convenient to assume as a base the height of the vessel aimed at, which height in the case of war ships is always very approximately known, and to measure the angle subtended by said height or base with the known method of obtaining two images of the viewed ship and collimating said images, the upper end of one image touching the lower end of the other.

The section of the instrument which is appointed to the measurement of angle $\beta$ is automatically set with respect to the range, and adjusted by hand with respect to the known length of the horizontal base taken on the ship aimed at, (which will be called hereinafter for sake of simplicity the "target"), whilst the horizontal angle subtended by said horizontal base is measured with the known method of obtaining two images of the base and collimating said images bow to stern.

The torpedo launching angle is easily determined by setting a movable graduated scale in relation to the ratio between the target speed and the torpedo speed, on which graduated scale the reading is made in correspondence to the index of angle $\beta$.

The instrument forming the object of this invention is of course provided with the usual devices to maintain it pointed on the moving target.

The invention is shown in a preferred form of embodiment in the annexed drawings in which:

Figure 1 is a top plan view of an instrument according to the invention;

Figure 2 is a vertical sectional view of the instrument, the section being taken on the line 2—2 of Fig. 1 and looking in the direction of the arrows at said line;

Figure 3 is a vertical sectional view taken on the diametrical dotted line of Fig. 1 and looking in the direction of the arrows 3—3 at said line;

Figure 4 is a vertical sectional view taken on the diametrical dotted line of Fig. 1 and looking in the direction of arrows 4—4 at said line;

Figure 5 is a vertical sectional view, on a reduced scale, of the top portion of an instrument according to the invention, more particularly adapted for submarine boats.

As is easily apparent from the drawings, the instrument is worked by two operators, one of which, by viewing at the target through the ocular A, ascertains the distance by height collimation of the vertical base, whilst at the same time, by manipulating button 1, he causes through a convenient train of transmissions the rotation of the upper prisms in a vertical plane in order to compensate for the oscillations of the ship.

The other operator meanwhile views at the same target through ocular B and by effecting the lateral collimation of the horizontal base, measures angle $\beta$, whilst at the same time, by operating the hand wheel 2 he causes the instrument to rotate so as to maintain it steadily and exactly pointed on the target.

Operator A must adjust the instrument in relation to the target's height, whilst operator B must adjust the instrument in relation to the horizontal base on the target and the ratio between the target speed and the torpedo speed.

From the following specification the peculiar features of the instrument, as well as the way to operate and use it, will clearly appear.

Mounted on the spindle of the knurled button 1, is a bevel wheel 15 meshing with bevel wheel 16 mounted on the vertical spindle 17, on the upper end of which is keyed an endless screw 18 which meshes with the worm wheel 19, which latter is fixed on shaft 64 with which are connected the frames of the upper prisms 20 and 21. On operating the knurled button 1, the inclination of the upper prisms will be varied and the aim on the target can therefore be kept steady in spite of the rolling of the ship on which the instrument is placed.

As already mentioned hereinbefore the instrument is rotated as a whole by operating the hand wheel 2, on the spindle of which is keyed an endless screw which meshes with a worm crown wheel not shown, which is carried by the fixed or base section of the instrument.

Operator A must, as already said, set the instrument according to the value of the height of the target. This adjustment will be effected by operating the knurled button 3, on the spindle of which is mounted a bevel wheel 23, meshing with wheel 22, said bevel wheel 22 being fixed on shaft 24 on which are keyed two endless screws 25, 27.

Endless screw 25 engages with worm wheel 26 positively connected with disc 26' which bears a graduated scale corresponding to the heights. Screw 27 engages the worm wheel 28 which is positively connected with planet wheel 28' of the differential gear D1 (Fig. 2).

Button 3 must be so operated that the height pointing hand should mark the height of the target on disc 26'.

As during this regulation the differential spider 29 is kept still by the transmission controlled by the collimation hand wheel 5, the rotation of planet wheel 28' results in a rotation of the other planet wheel 31 which, through wheel 32 keyed on its spindle, moves a wheel 33 on the spindle 33' on which the disc 6 is mounted. Said disc 6 bears a graduated scale corresponding to the target distances.

In other words, at each move of button 3 corresponds a displacement of disc 6.

In order to measure the distance, operator A turns hand wheel 5 which, through bevel gear 5' keyed on its spindle, moves bevel gear 30 which is fixed on the vertical shaft 30'. Shaft 30' has on its lower part an endless screw 34 which engages a worm wheel 35, which is positively connected to the differential spider 29 of differential D1.

The upper end of shaft 30' carries a second endless screw 36 meshing with a worm wheel 37 which is positively connected to cam 38 which has a logarithmic outline and controls the moving slide 39. This moving slide 39, which is illustrated in the drawings in a purely diagrammatical way, carries two half lenses 40 and 41, which are therefore shiftable with respect to their associated half lenses 40' and 41'.

A spring 39' acts upon slide 39 in such a way as to keep it always in touch with the edge of cam 38.

As it is well known, a displacement of the half lenses 40 and 41 causes a displacement of the images in a vertical direction. The operation of hand wheel 5 results finally in a movement of the half lenses 40 and 41 and in a rotation of the differential spider 29. As now the planet wheel 28' is kept still by the transmission controlled by the knurled button 3, a rotation of the differential spider 39 causes a rotation of the planet wheel 31 which, as already stated, acts on disc 6 which bears the distance scale.

Hand wheel 5 must be operated in such a way that the two images of the target should be seen in exact collimation one above the other.

If the logarithmic outline of cam 38 is correct and the graduations are exactly traced, the distance of the target will be read on disc 6 in correspondence to the pointer with greater approximation than may be obtained with a common medium sized range finder, even when the instrument be set in relation to a vertical base remarkably different from the actual height of the target, as can be demonstrated by calculation.

The range thus measured will then be automatically introduced in the second section of the instrument which serves to measure angle $\beta$. In fact the planet wheel 31 of the differential D1 is positively connected with spindle 42 which carries the planet wheel 42' of differential D2.

On the other hand the differential spider 43 of said differential D2 is positively connected with a worm wheel 44 which engages the endless screw 45 carried in turn by spindle 46.

Spindle 46 is rotated through bevel gears 9' and 46', when the collimation hand wheel 9 is operated.

The upper portion of spindle 46 bears an endless screw 65 which engages the worm wheel 66 coaxial with cam 67, which latter controls the movement of slide 68 carrying the half lenses 69, 70. The direction of movement of slide 68 is perpendicular to the direction of movement of slide 39.

Slide 69 is subjected to the action of a spring (not shown) which serves to maintain said slide always in touch with the edge of cam 67. The fixed half lenses respectively associated with half lenses 69 and 70 are indicated as 69' and 70'.

In short, the movements of planet wheel 42' and differential spider 43 are differentially taken up by planet wheel 47, which latter, through a couple of toothed wheels 48, 49, transmits its movement to planet wheel 50 of differential D3.

The second planet wheel 51 of differential D3 is moved through button 7 which serves to set the instrument in accordance with the value of the horizontal base taken on the target, said button 7 being in fact connected to said planet wheel 51 through bevel wheels 55 and 54, endless screw 52 and worm wheel 53.

Spindle 52' of endless screw 52 bears the endless screw 56 which meshes with worm wheel 57 positively connected with a drum 8 on which the graduated scale of the horizontal bases is engraved or otherwise recorded.

The differential spider 58 of differential D3 will therefore differentially take up the movements imparted to planet wheel 50 (which movements are a function of the parallactical angle $\eta$ subtended by the target, and of the range $x$) and the movements imparted to planet wheel 51 which are a function of the length 1 of the considered base. The total movement of differential spider 58 will therefore be a function of $$\frac{\eta x}{1}$$

and consequently of sin. $\beta$.

The differential spider 58 through its shaft 59 moves the toothed wheel 60 meshing with toothed wheel 61 which is positively connected with the movable hand 11 which points to the value of angle $\beta$ on the fixed disc 10.

As it is known, the torpedo launching angle is a function of angle $\beta$ and of the ratio between target speed and torpedo speed. In order to determine said launching angle, a movable graduated annulus 12 is concentrically placed outside disc 10. A fixed graduated annulus 13 is concentrically placed outside annulus 12. Said annulus 13 bears the graduated scale relating to the torpedo speeds. The scale of the target speeds is engraved on the outer edge of annulus 12, whilst the scale of the launching angles is engraved on the inner edge of said annulus 12. This latter is controlled by button 14 through endless screw 63 and worm wheel 62. Button 14 must be rotated until annulus 12 should take such a position that the graduation corresponding to the assumed speed of the target be in correspondence with the graduation corresponding to the known speed of the torpedo to be launched. The movable hand 11 will indicate on the inner edge of the movable annulus 12, graduated with the launching angles, the launching angle which was to be determined.

In the above specification it has been purposely omitted to mention any constructive detail, as it must be understood that a number of particular arrangements of different kinds may be adopted according to desire.

The example illustrated in the drawings relates to an instrument of the hyposcopic type, which is preferable as it allows a larger field of vision. The oculars are diametrically opposed, so that the observers should not interfere with one another.

Any suitable optical system adapted to afford the desired magnification in the various cases may be adopted for the instrument forming the object of this invention.

In Fig. 5 I have illustrated the upper part of an instrument according to this invention, more particularly adapted for submarine boats.

As the outer periscopic tube must not exceed a given diameter, the upper part of the two optical systems, which respectively correspond to the range finder and to the inclinometer, are situated very close to each other. The two upper rectangular prisms 106 and 108 are placed each at a different height. These prisms direct the light beams through two distinct telescopes situated one near the other and having the same construction of an ordinary periscope in their portion above the first focal plane. The lenses of the two telescopes are respectively designated as 109, 110, 111, 112, 113, 114 and 109', 110', 111', 112', 113', 114'. After the first focal plane the two beams meet the rhombic prisms 116 and 118 respectively, which deviate said beams bringing them on the optic axis of the range finder and of the inclinometer respectively. The objective lenses of the range finder are designated on the drawings as 119 and 121 and those of the inclinometer as 120, 122.

When the movable half lenses register exactly with their associated fixed halves, the instrument acts as an ordinary periscope for two observers; when, on the contrary, the telemetric section of the apparatus is set in relation to the vertical base of the target and the other section of said apparatus is set in relation to the horizontal base of the target, on effecting the collimations hereinabove specified, both the range and angle $\beta$ are measured. On positioning the movable scale of the section appointed to the determination of the launching angle, so that the graduation corresponding to the target speed registers with the graduation corresponding to the torpedo speed, the launching angle will be read in correspondence of the hand which points to angle $\beta$ also.

While I have shown and described with considerable detail one form of the instrument according to my invention, it should be understood that various changes may be made therein, and parts thereof may be employed without others, without departing from my invention as it is defined in the accompanying claims.

What is claimed is:

1. In an instrument for determining the shooting data for shooting at ships, a housing adapted to be mounted for rotation in azimuth, two optical devices disposed in the housing, one for finding the range of the target and one for finding the angle embraced by the course of the target and the vertical plane containing the line of sight to the target, and means for so interconnecting these two devices that the target range found through the agency of the said rangefinding device is automatically introduced into the said angle-finding device.

2. In an instrument for determining the shooting data for shooting at ships, a housing adapted to be mounted for rotation in azimuth, two optical devices disposed in the housing, one for finding the range of the target and one for finding the angle embraced by the course of the target and the vertical plane containing the line of sight to the target, the said rangefinding device, which is of the type in which use is made of a vertical base line at the target, having means for providing superimposed double images of the target, adjusting means which may be adjusted according to the height of the target and means for measuring the parallactic angle due to this height, the said instrument further comprising means for so interconnecting the said two devices that the target range found through the agency of the said rangefinding device is automatically introduced into the said angle-finding device.

3. In an instrument for determining the shooting data for shooting at ships, a housing adapted to be mounted for rotation in azimuth, two optical devices disposed in the housing, one for finding the range of the target and one for finding the angle embraced by the course of the target and the vertical plane containing the line of sight to the target, the said rangefinding device, which is of the type in which use is made of a vertical base line at the target, having a lens system which is to produce superimposed double images of the target and is displaceable for the reciprocal adjustment of these double images, the said lens system being provided with adjusting means which may be adjusted according to the height of the target, the said rangefinding device further having indicating means for indicating the determined range and a rotatable logarithmic cam disc so coupled to the said lens system as to displace this system, the said instrument having a differential wheel gear with two driving shafts and a driven shaft, these two driving shafts being coupled to the said adjusting means and to the said cam disc, respectively, and the said driven shaft being coupled to the said indicating means and to the said angle-finding device.

4. In an instrument for determining the shooting data for shooting at ships, a housing adapted to be mounted for rotation in azimuth, two optical devices disposed in the housing, one for finding the range of the target and one for finding the angle embraced by the course of the target and the vertical plane containing the line of sight to the target, the said angle-finding device having adjusting means which may be adjusted according to the length of the target and means for finding the parallactic angle due to the length of the target by producing two images of the target and displacing the same relatively to each other, the said instrument further having means for so interconnecting the said two devices that the target range found through the agency of the said rangefinding device is automatically introduced into the said angle-finding device.

5. In an instrument for determining the shooting data for shooting at ships, a housing adapted to be mounted for rotation in azimuth, two optical devices disposed in the housing, one for finding the range of the target and one for finding the angle embraced by the course of the target and the vertical plane containing the line of sight to the target, the said angle-finding device having adjusting means which may be adjusted according to the length of the target and a lens system for producing double images of the target which lie next to each other, this lens system being displaceable for the reciprocal adjustment of these double images, the said angle-finding device further having indicating means for indicating the said angle and a rotatable logarithmic cam disc so coupled to the said lens system as to displace this system, the said instrument having two differential wheel gears, each of these differential wheel gears having two driving shafts and a driven shaft, the two driving shafts of the one differential wheel gear being coupled to the said rangefinding device and to the said cam disc, respectively, and the two driving shafts of the other differential wheel gear being coupled to the driven shaft of the first said differential wheel gear and to the said adjusting means, respectively, the driven shaft of the said other differential wheel gear being connected to the said indicating means.

6. In an instrument according to claim 1, means for indicating the said angle and a device for finding the launching data of torpedoes, these indicating means comprising a fixed circular scale and a pointer rotatable relatively to this scale, the device for finding the launching angle comprising an annular disc rotatable about an axis through the centre of the said scale, one edge of this disc lying near the said pointer, and two scales concentric to the said scale and representing torpedo and target speeds, respectively, the one of these two scales being fixed next to the other edge of the said disc, and the other of these two scales being disposed on this other edge of the said disc.

FRANCESCO MONTAUTI.